July 25, 1944.　　　　J. E. BROWN　　　　2,354,195
FILTER TANK ASSEMBLY
Filed June 14, 1941　　　　2 Sheets-Sheet 1
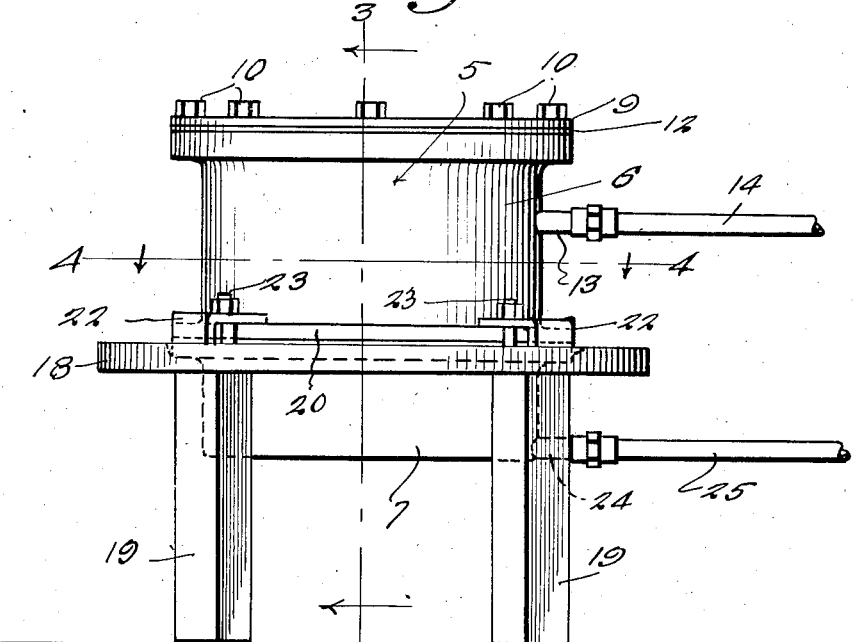
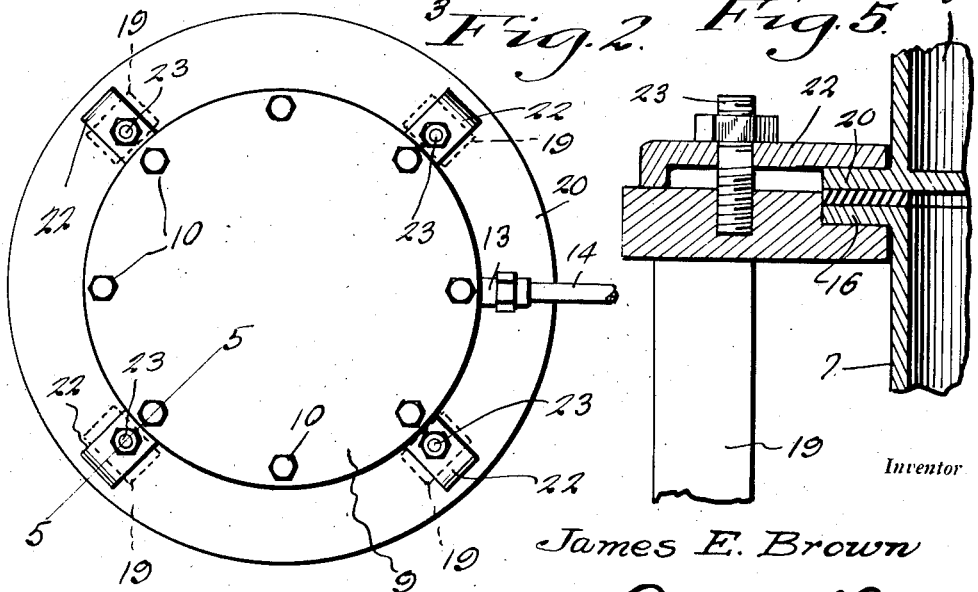
Inventor
James E. Brown
By Clarence A. O'Brien
Attorney July 25, 1944.  J. E. BROWN  2,354,195
FILTER TANK ASSEMBLY
Filed June 14, 1941  2 Sheets—Sheet 2
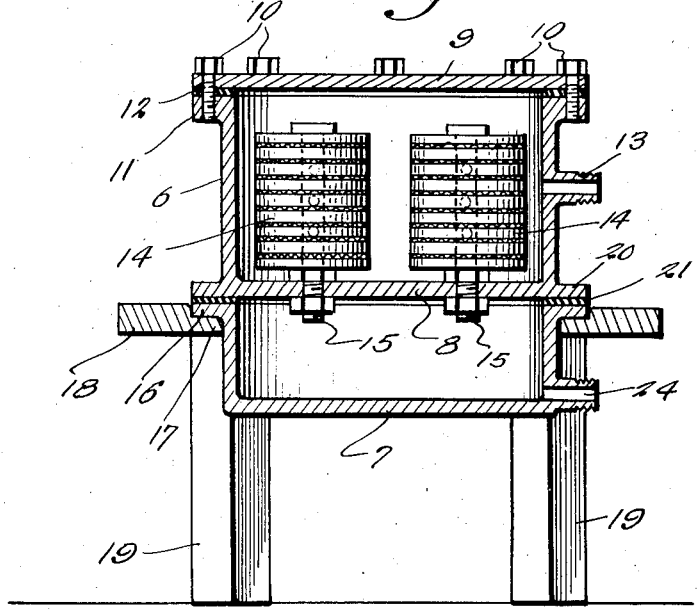
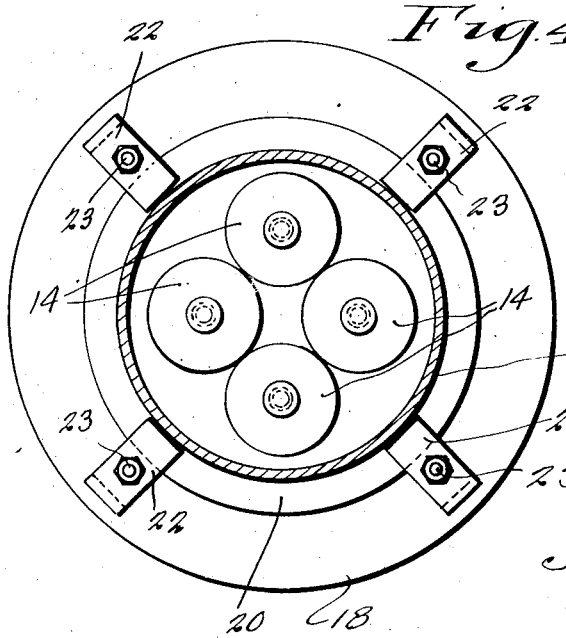
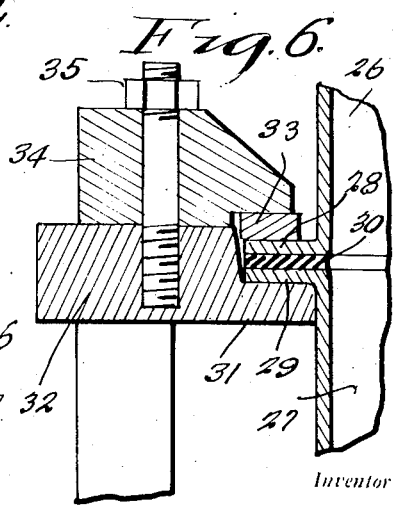
Inventor
James E. Brown
By Clarence A. O'Brien
Attorney Patented July 25, 1944

2,354,195

UNITED STATES PATENT OFFICE 2,354,195

FILTER TANK ASSEMBLY

James E. Brown, Brookville, Pa., assignor to James L. Brown, Grove City, Pa.

Application June 14, 1941, Serial No. 398,133

2 Claims. (Cl. 210—148)

The present invention relates to new and useful improvements in filtering devices for removing sediment and other foreign substances from various liquids, especially milk and milk products, and has for its primary object to provide a filtering tank assembly embodying a sectional filtering tank in which the filtering units are mounted, together with means for effectively clamping the sections of the tank together.

A further object is to provide a device of this character of simple and practical construction, which is efficient and reliable in performance, relatively inexpensive to manufacture, and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a vertical sectional view taken substantially on a line 3—3 of Figure 1.

Figure 4 is a horizontal sectional view through the upper section of the tank taken substantially on a line 4—4 of Figure 1.

Figure 5 is a fragmentary sectional view through one of the clamps for clamping the sections together, and Figure 6 is a similar view of a modified form of tank construction and clamping element therefor.

Referring now to the drawings in detail and with particular reference to Figures 1 to 5 inclusive, the numeral 5 designates the filter tank generally which includes an upper tank section 6 and a lower tank section 7. The upper tank section 6 is of cylindrical form and includes a bottom 8 and a removable cover or lid 9 secured in position by bolts 10 which are threaded in a flange 11 at the upper edge of the tank section 6. A gasket 12 is interposed between the lid and the flange to provide a liquid-tight seal for the lid.

Projecting radially from one of the side walls of the tank section 6 is an inlet nipple 13 to which a supply pipe 13' is attached for supplying liquid to the tank to be filtered. Supported in the upper section 6 of the tank are a plurality of filtering units designated generally at 14 and which are of laminated construction and supported on a perforated pipe 15 extending through the bottom 8 of the upper tank section 6. The particular construction of the filtering unit forms no part of the present invention and accordingly a detailed description thereof is not deemed necessary. The liquid is adapted to enter the upper section 6 of the tank through the nipple 13 and between the laminations of the filtering unit 14 into the pipe 15 whereupon the filtered liquid is discharged from the upper section 6 into the lower section 7.

The lower section 7 is of generally open pan form and includes a flange 16 at its upper edge adapted to rest on the inwardly projecting flange 17 of a supporting ring 18 mounted on top of the supporting legs 19. The lower flange 20 at the bottom of the tank section 6 rests on the flange 16 of the lower section 7 with a gasket 21 positioned therebetween, the flanges 16 and 20 being secured in position by a clamping plate 22 secured to the ring 18 by a bolt and nut 23 as shown in detail in Figure 5 of the drawings. The lower section 7 is provided with a discharge nipple 24 adjacent its bottom portion to which a discharge pipe 25 is attached.

In the form of the invention illustrated in Figure 6 the bottom for the upper section 6 is eliminated, the upper section 26 and the lower section 27 having open communication with each other and provided with flanges 28 and 29 respectively at their meeting edges between which the gasket 30 is positioned. The flanges 28 and 29 rest on the inwardly projecting flange 31 of the supporting ring 32 and positioned on the flange 28 is a clamping flange 33 of flat frangible alloy material adapted to break and crumble upon a predetermined pressure within the tank to avoid explosion thereof. The clamping ring 33 and the flanges are secured in position by a clamping block 34 and bolt and nut 35.

In this form of the invention the bottom of the upper section of the tank is eliminated and the filter units are mounted in the bottom of the lower section.

It is believed the details of construction, advantages, and manner of use of the device will be readily understood from the foregoing without further detailed explanation.

Having thus described my invention, what is claimed as new is:

1. A filter tank assembly comprising a pair of tank sections arranged in superposed relation, the lower tank section being open at its top and closed by the upper tank section, said upper tank section having a filter in its bottom adapted to filter liquid passing from one tank section to the other, one of said tank sections having an intake connection and the other tank section having an outlet connection, flanges on the bottom of the upper tank section and on the upper edge of the lower tank section, a support for the sections and including a ring having an inwardly projecting flange below the surface of the ring and forming an annular recessed seat on which the flanges of the sections are positioned, a gasket between the flanges of the sections, clamping plates having one end overlying the flanges of the sections and bolts securing the other ends of the plates to the ring for clamping the flanges of both sections of the tank on the flange of the ring.

2. A filter tank assembly comprising a pair of tank sections arranged in superposed relation, flanges on the sections, a support for the sections and including a ring having an inwardly projecting flange below the surface of the ring and forming an annular recessed seat on which the flanges of the sections are positioned, a gasket between the flanges of the sections, a frangible clamping ring on top of said flanges of the sections and clamping means carried by the support for securing said clamping ring and flanges together.

JAMES E. BROWN.